United States Patent
Lolli

(10) Patent No.: US 10,265,939 B2
(45) Date of Patent: Apr. 23, 2019

(54) METHOD AND ASSOCIATED UNIT FOR REMOVING PLATE-LIKE ELEMENTS

(71) Applicant: TECNA S.P.A., Castel San Pietro Terme (IT)

(72) Inventor: Andrea Lolli, Budrio (IT)

(73) Assignee: TECNA S.P.A., Castel San Piero Terme (IT)

( * ) Notice: Subject to any disclaimer, the term of this patent is extended or adjusted under 35 U.S.C. 154(b) by 0 days.

(21) Appl. No.: 15/037,478

(22) PCT Filed: Nov. 22, 2013

(86) PCT No.: PCT/IT2013/000329
§ 371 (c)(1),
(2) Date: May 18, 2016

(87) PCT Pub. No.: WO2015/075753
PCT Pub. Date: May 28, 2015

(65) Prior Publication Data
US 2016/0279921 A1    Sep. 29, 2016

(51) Int. Cl.
| | | |
|---|---|---|
| *B32B 43/00* | (2006.01) | |
| *B32B 38/10* | (2006.01) | |
| *B26F 3/16* | (2006.01) | |
| *B26D 5/00* | (2006.01) | |
| *H05B 3/00* | (2006.01) | |
| *C09J 5/00* | (2006.01) | |
| *B32B 37/12* | (2006.01) | |
| *B62D 65/00* | (2006.01) | |
| *B62D 67/00* | (2006.01) | |

(52) U.S. Cl.
CPC ............... *B32B 38/10* (2013.01); *B26D 5/00* (2013.01); *B26F 3/16* (2013.01); *B32B 37/12* (2013.01); *B32B 43/006* (2013.01); *B62D 65/00* (2013.01); *C09J 5/00* (2013.01); *H05B 3/0038* (2013.01); *B32B 2605/00* (2013.01); *B62D 67/00* (2013.01); *C09J 2205/302* (2013.01); *C09J 2205/31* (2013.01); *H05B 2203/032* (2013.01); *Y02W 30/56* (2015.05); *Y10T 156/1158* (2015.01); *Y10T 156/1917* (2015.01)

(58) Field of Classification Search
CPC . B32B 38/10; B32B 43/006; Y10T 156/1158; Y10T 156/1917
USPC .................................................. 156/712, 753
See application file for complete search history.

(56) References Cited

U.S. PATENT DOCUMENTS

| | | | |
|---|---|---|---|
| 4,202,282 A * | 5/1980 | Hobbs | F23G 5/004 110/250 |
| 4,983,809 A | 8/1991 | Maiette | |
| 5,525,182 A | 11/1996 | Miller | |
| 8,211,259 B2 * | 7/2012 | Sato | B08B 7/0057 156/247 |
| 2009/0084983 A1 | 2/2009 | Simandl | |
| 2010/0243159 A1* | 9/2010 | Nishio | B29C 53/32 156/712 |
| 2010/0263587 A1* | 10/2010 | Sivaramakrishnan | C30B 25/08 117/94 |
| 2012/0318463 A1* | 12/2012 | Anderson | B32B 17/10036 156/712 |
| 2013/0084459 A1* | 4/2013 | Larson | C09J 4/00 428/422 |
| 2013/0213582 A1* | 8/2013 | Inao | H01L 21/6835 156/712 |

OTHER PUBLICATIONS

International Search Report (Form PCT/ISA/210) for International Application No. PCT/IT2013/000329 dated Jul. 23, 2014.

* cited by examiner

*Primary Examiner* — Mark A Osele
*Assistant Examiner* — Nickolas R Harm

(57) ABSTRACT

A method for removing plate-like elements, such as panels, paneling elements, plates, laminas, covering layers, and the like, coupled stably to a respective base by way of the interposition of an adhesive, which consists in: exposing, in a step a., the plate-like element to be removed to a source of infrared radiation to increase the temperature of the plate-like element and consequently of the adhesive by the heat conveyed by the infrared radiation; extending, in a step b., the exposure of the plate-like element to the source until the mechanical properties of the adhesive are lost; removing, in a step c., the plate-like element from the base.

3 Claims, No Drawings

METHOD AND ASSOCIATED UNIT FOR REMOVING PLATE-LIKE ELEMENTS

The present invention relates to a method for removing plate-like elements and to the associated unit.

In industrial practice sometimes there is the need to remove metal panels or similar plate-like elements that are applied rigidly to other surfaces by adhesive bonding.

For example, this need arises in the automotive sector, in which (due to repair or maintenance interventions) it becomes necessary to detach external paneling elements that are made to adhere, by means of an adhesive, to the structure of the vehicle.

For this purpose, therefore, according to known methods, the panels to be removed are heated until the adhesive is brought to the temperature at which it looses its mechanical properties, thus eliminating the coupling that it provides, and then removal is performed.

Currently, in order to achieve the desired heating, the paneling is affected by a stream of hot air (generated for example by a heat gun) or by a high-frequency magnetic field (generated by using an adapted inductor).

However, these constructive solutions are not devoid of drawbacks.

First of all, it should be noted in fact that resorting to high-frequency and high-intensity magnetic fields (such as indeed the ones used to heat the panel) causes conditions of potential danger for the health of the operators, who are exposed to these fields.

Moreover, the processes for removing the paneling elements cited previously entail very long execution times, which are increasingly less acceptable in the current production environment; besides, the times are often increased further by the need to vary the form and/or type of the heat source as the shape of the panels to be removed (and the structure of the vehicle to which they are applied) changes and in any case by the need to provide a preliminary step of preparing the paneling to be removed.

Finally, it should be noted that the traditional methods that have been referenced so far are scarcely versatile, since they are entirely unsuitable when the removal of plate-like elements made of nonmetallic materials is required.

The aim of the present invention is to solve the problems described above, by proposing a method that allows to remove plate-like elements in a practical and safe manner.

Within this aim, an object of the invention is to provide a unit that allows to remove plate-like elements in a practical and safe manner.

Another object of the invention is to propose a method that allows to remove plate-like elements without endangering the health of the operator.

Another object of the invention is to propose a method that allows to remove plate-like elements in a short time and without wasting power and costs.

Another object of the invention is to propose a method that ensures high reliability in operation and proves to be absolutely versatile and adapted for any material of the plate-like elements to be removed.

Another object of the invention is to propose a method that can be performed easily starting from commonly commercially available elements and materials.

This aim, as well as these and other objects that will become better apparent hereinafter, are achieved by a method for removing plate-like elements, of the type of panels, paneling elements, plates, laminas, covering layers, and the like, coupled stably to a respective base by way of the interposition of an adhesive, characterized in that it consists in exposing the plate-like element to be removed to a source of infrared radiation, in order to increase the temperature of the plate-like element and accordingly of the adhesive, by means of the heat conveyed by the infrared radiation; in prolonging the exposure of the plate-like element to said source until the mechanical properties of the adhesive are lost; in removing the plate-like element from the base.

This aim and these and other objects are also achieved by a unit for removing plate-like elements, such as panels, paneling elements, plates, laminas, covering layers, and the like, coupled stably to a respective base by way of the interposition of an adhesive, characterized in that it comprises a source of infrared radiation, in order to raise the temperature of the plate-like element, and accordingly of the adhesive, by means of the heat conveyed by the infrared radiation, until the mechanical properties of the adhesive are lost, in order to allow removal of the plate-like element from the base.

Further characteristics and advantages of the invention will become better apparent from the description of a preferred but not exclusive embodiment of the method according to the invention and of an embodiment of the associated unit.

The method according to the present invention is therefore preset for the removal of plate-like elements, such as for example panels, paneling elements, plates, laminas, covering layers, and the like, in any case coupled stably to a respective base by means of the interposition of an adhesive.

It is therefore noted from the outset that the method according to the invention can be applied in any industrial (and non-industrial) field for the removal of plate-like elements of any type (and, as will become apparent, made of any material), coupled (by means of an adhesive) to bases that in turn can be various, without thereby abandoning the protective scope claimed herein. It should also be specified that the method according to the invention can be used validly to remove panels that are coupled stably to the respective base by means of adhesives of various types.

In any case, in the preferred but not exclusive application to which reference will be made occasionally, the method can be performed to remove plate-like elements, constituted by panels (made of metallic material and not only), from a base, which in turn is constituted by the structure of a vehicle, for example to allow repair or maintenance interventions.

According to the invention, the removal method consists first of all, in a step a., in exposing the plate-like element to be removed to a source of infrared radiation: this allows to obtain the progressive increase of the temperature of the plate-like element and consequently of the adhesive by means of the heat conveyed by the infrared radiation.

The removal method further provides, in a step b., for extending the exposure of the plate-like element to the source until the mechanical properties of the adhesive are lost (indeed due to the effect of heating).

With the loss of the mechanical properties of the adhesive, and therefore of its ability to cause the adhesion of the plate-like element to the base, it is thus possible, in a step c., to remove the plate-like element from the base.

In particular, in the preferred but not exclusive embodiment of the invention, step a. consists in exposing the plate-like element to a source constituted by a (high-power) lamp that emits infrared radiation.

Conveniently, in order to ensure a qualitatively optimum result and avoid running the risk of deteriorating or damaging the plate-like element, the method provides, during the execution of step b., for the detection, in a step b1., of the instantaneous temperature value of the plate-like element, and for the adjustment, in a step b2., of the power delivered by the lamp (or other source) as a function of this instantaneous value and of a desired target value, at which indeed the loss of the mechanical properties of the adhesive occurs. This allows first of all to deliver the power in a controlled manner and to keep the temperature of the plate-like element below a preset threshold value, thus preventing that by supplying too much power the plate-like element might be heated more than necessary, up to such thresholds as to cause indeed damage or deterioration thereof (or, more simply, causing an unnecessary waste of power and an unjustified excess of expense).

Furthermore, the method according to the invention provides, in a step b3., for repeating step b1. and step b2. at predefined time intervals (even to the point of performing them continuously), so as to achieve the keeping of the temperature of the plate-like element at a working value that is substantially constant and corresponds to the target value for at least part of step b.

In this manner, when the temperature of the panel (or other plate-like element) reaches the target value, and one continues to supply power to allow degradation of the adhesive until its mechanical properties are lost, it is possible to modulate power delivery so that, at least for the subsequent part of the method, heating occurs at a constant temperature of the panel, thus avoiding again the reaching of excessive temperatures, which are harmful for the materials of which the panel (and/or the base) is made, or in any case avoiding useless waste of power.

It should be noted that the selected target value can vary significantly, as a function of the specific type of adhesive used, without thereby abandoning the protective scope claimed herein: merely by way of nonlimiting example of the application of the invention, it is therefore noted that for some adhesives normally used commercially said target value can be comprised for example between 120° C. and 180° C.

More particularly, step b1. provides for detecting (without contact) the instantaneous temperature value by means of a pyrometric sensor that is functionally associated with the source (and for example installed on it), while step b2. provides for adjusting the power delivered by means of an electronic unit for control and management of the source (for example therefore an electronic controller with which the lamp that constitutes the infrared radiation source is provided).

Conveniently, the removal process also provides, during step b., for containing, in a step b4., the temperature of the outer shell of the lamp (or other source) in order to prevent an excessive overheating thereof and allow practical use of the lamp (or other source) by an operator.

In particular, step b4. consists in subjecting the outer shell to the action of at least one cooling circuit provided in the lamp. More particularly, in the preferred embodiment of the removal method according to the invention, the step b4. consists in subjecting the outer shell to the action of a first water-cooled cooling circuit that is provided in the lamp and of a second air-cooled cooling circuit that is provided in the lamp.

The use of a dual cooling circuit thus allows to contain, in the already cited step b4., the temperature of the shell of the lamp within an acceptable limit and therefore allows the operator to grip easily said lamp to use it in the removal method according to the invention.

The present invention also relates, therefore, to a unit for removing plate-like elements such as panels, paneling elements, plates, laminas, covering layers, and the like, coupled stably to a respective base by means of the interposition of an adhesive.

According to the invention, the unit comprises first of all an infrared radiation source, in order to increase the temperature of the plate-like element and consequently of the adhesive by means of the heat conveyed by the infrared radiation, until the mechanical properties of the adhesive are lost, in order to allow removal of the plate-like element from the base.

Furthermore, in a constructive solution of considerable practical interest, which does not limit the application of the invention, the unit can comprise a pyrometric sensor, functionally associated with the source, in order to detect the instantaneous temperature value of the plate-like element, and an electronic unit for the control and management of the source.

The control and management unit is thus capable of adjusting the power delivered by the source as a function of the instantaneous temperature value of the plate-like element, detected by the pyrometer, and of a desired target value.

This allows to deliver the power in a controlled manner and to maintain the temperature of the plate-like element below a predefined threshold value (and also, following the iteration of the detection and adjustment activities, to keep the temperature of the plate-like element at a working value that is substantially constant and corresponds to the target value during at least part of the already described step b.).

In particular, the source, which is preferably but not exclusively selected of the type of a (high-power) lamp that emits infrared radiation, which in turn is provided with respective outer shell, comprises a first water-cooled cooling circuit, and a second air-cooled cooling circuit in order to cool said shell and prevent an excessive overheating thereof, so as to ensure, as already shown in the preceding pages, practical use of the lamp by an operator.

Within the scope of the present invention the use of a unit according to what has been indicated in the preceding paragraphs is also claimed, for the removal of plate-like elements, such as panels, paneling elements, plates, laminas, covering layers, and the like, coupled stably to a respective base by way of the interposition of an adhesive.

It has thus been shown that by means of the method (and the unit) according to the invention it is possible to achieve the heating of a panel (and of the adhesive that ensures its adhesion to the structure of the vehicle, or other base) and therefore its removal (when the adhesive looses its mechanical properties, due to the heat), in a practical and easy manner.

Moreover, heating is achieved by means of the heat conveyed by infrared radiation, which, differently from the high-frequency magnetic field according to known methods, causes no risk for the health and safety of the operator.

It is noted moreover that thanks to the containment of the temperature of the outer shell of the lamp, achieved by means of at least one cooling circuit (and preferably by means of two circuits), the operator can grip and handle the lamp conveniently, without running the risk of scalding and burns, or in any case without forcing him to pay particular attention to the temperature of the tool he is holding.

As shown in the preceding pages, the presence of the pyrometric sensor and of the control and management unit associated therewith ensures optimum modulation of the delivered power and avoids the danger of deterioration or damage to the panel or to the underlying structure during the execution of the removal method according to the invention.

It should also be noted that there are no contraindications to the use of infrared radiation with respect to any material (for example metallic panels, panels made of composite materials, carbon fiber panels, etc.), thus making the removal process according to the invention extremely versatile and adapted for any type of panel or other plate-like element.

Moreover, the use of a lamp (or other infrared radiation source) allows the operator to work while keeping a certain distance from the panel to be removed; therefore, as the shape of the panel varies it is not necessary to modify the shape and type of the lamp, reducing (or eliminating) setup times and increasing the versatility of the method according to the invention.

Moreover, the high power density that can be delivered by means of the lamp (which can exceed 600 kW/m$^2$) allows to achieve rapid heating of the panel to be removed (with a further containment of work times), limiting the diffusion of the heat in the underlying regions (and paneling elements). This ensures a further reduction in energy consumption and avoids wastes of power and money.

Finally, it is noted that the use of the infrared radiation source does not require any activity of preliminary preparation of the panel to be removed, thus rendering the method according to the invention even quicker (and further reducing intervention times) with respect to known methods.

In practice it has been found that the method and the unit according to the invention achieve fully the intended aim, since thanks to the exposure of the plate-like element to be removed to an infrared radiation source and to the extension of the exposure until the mechanical properties of the adhesive are lost it is possible to remove said plate-like element in a practical and safe manner.

The invention thus conceived is susceptible of numerous modifications and variations, all of which are within the scope of the accompanying claims; all the details may further be replaced with other technically equivalent elements.

In the examples of embodiment shown, individual characteristics, given in relation to specific examples, may actually be interchanged with other different characteristics that exist in other examples of embodiment.

In practice, the materials used, as well as the dimensions, may be any according to requirements and to the state of the art.

The invention claimed is:

1. A process for removing plate-like elements, coupled stably to a respective base by way of the interposition of an adhesive, comprising the steps of:
   a. exposing one of the plate-like elements to be removed to a lamp that emits infrared radiation to increase the temperature of the plate-like element and consequently of the adhesive by means of the heat conveyed by the infrared radiation;
   b. extending the exposure of the plate-like element to said lamp until the mechanical properties of the adhesive are lost, comprising:
   b1. detecting an instantaneous temperature value of the plate-like element and detecting the instantaneous temperature value by means of a pyrometric sensor that is installed on said lamp;
   b2. adjusting the power delivered by said lamp in response to the instantaneous detected temperature value of the plate-like element and of a desired target value, for the controlled delivery of power and for maintaining the temperature of the plate-like element below a predefined threshold value and adjusting the delivered power by means of an electronic unit for the control and management of said lamp;
   b3. repeating said step b1. and said step b2. at predefined time intervals in order to maintain at a substantially constant working value, which depends upon said target value, the temperature of the plate-like element for at least part of said step b;
   b4. containing the temperature of an outer shell of said lamp by at least subjecting the outer shell to the action of at least one cooling circuit provided in said lamp; and
   c. removing the plate-like element from the base.

2. The process according to claim 1, wherein said step b4. consists in subjecting the outer shell to the action of a first water-cooled cooling circuit provided in said lamp and of a second air-cooled cooling circuit provided in said lamp.

3. A unit for removing plate-like elements, coupled stably to a respective base by way of the interposition of an adhesive, comprising:
   a source of infrared radiation, in order to raise the temperature of one of the plate-like elements and consequently of the adhesive by means of the heat conveyed by the infrared radiation, until mechanical properties of the adhesive are lost, in order to allow removal of the plate-like element from the base; and
   a pyrometric sensor, which is installed on said source to detect an instantaneous temperature value of the plate-like element, and an electronic unit for the control and management of said source, in order to adjust the power delivered by said source in response to the instantaneous temperature value of the plate-like element detected by said pyrometer and of a desired target value for the controlled delivery of power and to keep the temperature of the plate-like element below a predefined threshold value;
   wherein said source is selected of the type of a lamp that emits infrared radiation and is provided with a respective outer shell, wherein said source comprises a first water-cooled cooling circuit and a second air-cooled cooling circuit for the cooling of said outer shell and for preventing an excessive overheating thereof.

* * * * *